United States Patent
Ingrassia et al.

(10) Patent No.: US 10,735,118 B2
(45) Date of Patent: Aug. 4, 2020

(54) ACCESSING RADIO CONTENT FROM A NON-RADIO SOURCE

(71) Applicant: Apple Inc., Cupertino, CA (US)

(72) Inventors: Michael Ingrassia, San Jose, CA (US); Jeffery T. Lee, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/823,454

(22) Filed: Nov. 27, 2017

(65) Prior Publication Data

US 2018/0083724 A1   Mar. 22, 2018

Related U.S. Application Data

(62) Division of application No. 14/169,979, filed on Jan. 31, 2014, now Pat. No. 9,831,967, which is a division
(Continued)

(51) Int. Cl.
| | |
|---|---|
| *H04H 20/26* | (2008.01) |
| *H04H 20/24* | (2008.01) |
| *H04N 21/462* | (2011.01) |
| *H04H 60/74* | (2008.01) |
| *H04N 21/442* | (2011.01) |
| *H04N 21/466* | (2011.01) |
| *H04H 60/82* | (2008.01) |

(52) U.S. Cl.
CPC ............ *H04H 20/26* (2013.01); *H04H 20/24* (2013.01); *H04H 60/74* (2013.01); *H04N 21/44204* (2013.01); *H04N 21/466* (2013.01); *H04N 21/4622* (2013.01); *H04H 60/82* (2013.01)

(58) Field of Classification Search
CPC ........ H04H 20/20; H04H 20/24; H04H 20/26; H04H 60/37; G06Q 30/6041; G06F 17/30749
See application file for complete search history.

(56) References Cited

U.S. PATENT DOCUMENTS

| 4,918,531 A | 4/1990 | Johnson |
| 6,952,576 B2 | 10/2005 | Fish et al. |
(Continued)

OTHER PUBLICATIONS

Microsoft Computer Dictionary, Fifth Edition; entry for "remote" (copyright 2002) (Year: 2002).*
(Continued)

*Primary Examiner* — Andrew C Flanders
(74) *Attorney, Agent, or Firm* — Womble Bond Dickinson (US) LLP

(57) ABSTRACT

Systems and methods are provided for accessing broadcast media items and segments from non-broadcast sources. In response to detecting that a user has not finished listening to a broadcast segment (e.g., a radio segment), an electronic device can automatically identify and access an alternate, non-broadcast source for the same broadcast segment (e.g., a corresponding podcast episode). Using the electronic device, a user can play back the segment from the non-broadcast source, starting playback at the last position of the broadcast segment when the user stopped listening to the broadcast. In some embodiments, the electronic device can update library counts (e.g., play counts and new/not new tags) based on media items and segments played back as part of a media broadcast.

27 Claims, 6 Drawing Sheets

Related U.S. Application Data of application No. 12/425,800, filed on Apr. 17, 2009, now abandoned.

(56) References Cited

U.S. PATENT DOCUMENTS

| | | |
|---|---|---|
| 7,251,452 B2 | 7/2007 | Stumphauzer, II |
| 7,346,320 B2 | 3/2008 | Chumbley et al. |
| 7,409,205 B2 | 8/2008 | Mittal |
| 7,412,202 B2 | 8/2008 | Gutta et al. |
| 7,421,243 B2 | 9/2008 | Sato et al. |
| 7,587,185 B2 | 9/2009 | Nee |
| 7,647,419 B2 | 1/2010 | Deshpande |
| 7,653,342 B2 | 1/2010 | Nichols et al. |
| 7,676,203 B2 | 3/2010 | Chumbley et al. |
| 7,801,500 B2 | 9/2010 | Kraft et al. |
| 7,840,178 B2 | 11/2010 | Hellman |
| 8,296,195 B2 | 10/2012 | Harb |
| 2001/0041053 A1 | 11/2001 | Abecassis |
| 2002/0194593 A1 | 12/2002 | Tsuchida et al. |
| 2003/0014767 A1 | 1/2003 | Stumphauzer, II |
| 2003/0026344 A1 | 2/2003 | Rindsberg et al. |
| 2003/0037068 A1 | 2/2003 | Thomas et al. |
| 2003/0037124 A1 | 2/2003 | Yamaura et al. |
| 2003/0054758 A1* | 3/2003 | Kawamata ........... H04H 20/106 455/3.04 |
| 2003/0097338 A1 | 5/2003 | Mankovich et al. |
| 2003/0194977 A1 | 10/2003 | Videtich |
| 2004/0260682 A1 | 12/2004 | Herley et al. |
| 2005/0153650 A1 | 7/2005 | Hikomoto |
| 2005/0193015 A1 | 9/2005 | Logston et al. |
| 2005/0287972 A1 | 12/2005 | Christensen et al. |
| 2006/0058997 A1 | 3/2006 | Wood |
| 2006/0248441 A1* | 11/2006 | Baumert ........... H04N 21/42202 715/234 |
| 2007/0250597 A1 | 10/2007 | Resner et al. |
| 2007/0286169 A1 | 12/2007 | Roman |
| 2008/0030618 A1* | 2/2008 | Okamoto ............ H04H 20/12 348/553 |
| 2008/0077679 A1 | 3/2008 | Bawany et al. |
| 2008/0188209 A1 | 8/2008 | Dorogusker et al. |
| 2008/0201225 A1* | 8/2008 | Maharajh ............. H04L 67/30 705/14.43 |
| 2008/0207137 A1 | 8/2008 | Maharajh et al. |
| 2008/0222546 A1 | 9/2008 | Mudd et al. |
| 2008/0256453 A1 | 10/2008 | Fein et al. |
| 2008/0268772 A1 | 10/2008 | Linnamaki et al. |
| 2009/0023406 A1 | 1/2009 | Ellis |
| 2009/0274151 A1* | 11/2009 | Murai .................. H04N 7/163 370/390 |
| 2009/0298418 A1 | 12/2009 | Michael et al. |
| 2010/0010648 A1 | 1/2010 | Bull et al. |
| 2010/0106852 A1 | 4/2010 | Kindig et al. |
| 2010/0124892 A1 | 5/2010 | Issa et al. |
| 2010/0146573 A1 | 6/2010 | Richardson |
| 2010/0203823 A1* | 8/2010 | Apaar .................. H04H 20/20 455/3.06 |
| 2010/0255772 A1 | 10/2010 | Hellman |
| 2010/0268361 A1 | 10/2010 | Mantel et al. |

OTHER PUBLICATIONS

Non-Final Office Action (dated Sep. 12, 2012), U.S. Appl. No. 12/425,800, filed Apr. 17, 2009, First Named Inventors: Michael Ingrassia, 26 pages.

Final Office Action (dated Jan. 18, 2013), U.S. Appl. No. 12/425,800, filed Apr. 17, 2009, First Named Inventors: Michael Ingrassia, 16 pages.

Non-Final Office Action (dated Sep. 5, 2013), U.S. Appl. No. 12/425,800, filed Apr. 17, 2009, First Named Inventors: Michael Ingrassia, 18 pages.

IBM, "Predictive location based auto-tuning of radio systems", IPCOM000056563D, Feb. 14, 2005, 5 pages.

IBM, "Retrieving Information at a Later Time Related to What Was Being Broadcast at That Particular Time", IPCOM000139261D, Aug. 17, 2006, 3 pages.

Leydon, "Enhanced browsing and selection for media devices", IPCOM000131715D, Nov. 16, 2005, 5 pages.

live365.com "Live365 Internet Radio", http://www.live365.com, printed on Apr. 17, 2009, 2 pages.

* cited by examiner

ACCESSING RADIO CONTENT FROM A NON-RADIO SOURCE

This application is a divisional of U.S. application Ser. No. 14/169,979 filed on Jan. 31, 2014, which is a divisional of U.S. application Ser. No. 12/425,800 filed Apr. 17, 2009, now abandoned.

FIELD OF THE INVENTION

This relates to accessing the media content provided by a broadcast media source using a non-broadcast source. In particular, this relates to accessing radio content and radio segments from a non-radio source.

BACKGROUND OF THE INVENTION

Using a radio system, a user can receive radio waves broadcast from a radio station and provide an audio output associated with the received radio waves. Similarly, an electronic device can use communications circuitry to receive media broadcasts from non-radio media or content sources. The content of a particular radio broadcast, or more generally of a media broadcast, can vary with time. For example, a media broadcast can include a succession of different media items (e.g., different songs). As another example, a media broadcast can include a succession of segments (e.g., a succession of conversations or interviews with different guests).

A user, however, may not always have access to the radio broadcast stream or media broadcast stream provided by a content provider. For example, communications circuitry or radio tuning circuitry of an electronic device may not receive a radio broadcast (e.g., as the device goes into a tunnel or in an area that radio waves cannot access). As another example, communications circuitry can move too far from a broadcast source (e.g., a communications node of a communications network) to receive broadcast data. As still another example, the user is required to turn off the electronic device (e.g., turn off a car radio upon leaving a car). If a user is listening to a particular media item or radio segment of interest, the user may not be able to finish listening to the segment, and can miss parts of broadcast content before a second electronic device can receive the broadcast stream (e.g., the user turns on a radio in their house or office).

SUMMARY OF THE INVENTION

This is directed to systems, methods, devices and computer readable media for accessing media content that is broadcast by a content source at alternate times from non-broadcast sources. In particular, this is directed to accessing media and segments broadcast by a radio station from alternate sources. The media and segments can be accessed at any suitable time, including during or after the initial radio broadcast. Upon switching to an alternate source for the media or segment, the media or segment can play back from the playback position at which the radio broadcast was no longer received.

A communications device can receive media broadcasts from several content providers. For example, a communications device can include a radio operative to receive radio broadcasts from different radio stations (e.g., a car radio). The communications device can provide information identifying one or more of the broadcast source, particular media items or segments of the media broadcast, or other information identifying the broadcast to a cloud (e.g., a remote server) or electronic device in communication with the communications device. The cloud or electronic device can monitor one or both of the received information and information provided as part of the broadcast (e.g., and accessed by the cloud or electronic device) to determine the particular position or portion of the broadcast media item or segment received and played back by the communications device.

When the communications device is turned off or tunes away from a broadcast, the cloud or electronic device in communication with the communications device can receive a corresponding indication. For example, the communications device can broadcast a flag to the cloud or electronic device in response to receiving the instruction to turn off or tune away from a broadcast. As another example, the absence of a regular communication to the cloud or electronic device (e.g., a status signal transmitted every 15 seconds) can indicate that the communications device no longer receives a broadcast. In response to determining that the communications device is no longer receiving a broadcast, the cloud or electronic device can mark or tag the playback position of the broadcast media item or segment when the communications device stopped receiving the broadcast.

A user, however, may have wished to continue to listen to the media item or segment broadcast when the broadcast was lost. An electronic device can then be used to find an alternate, non-broadcast source for the broadcast media item or segment, and play back the media item or segment from the alternate source. For example, an electronic device can identify a podcast of the media item or segment. As another example, an electronic device can identify a unicast stream of the media item or segment, for example available from an Internet website associated with the content source (e.g., associated with the radio station). As still another example, an electronic device can identify the media item or segment in a locally stored or remotely available library (e.g., a library available in a cloud). Once the electronic device identifies the segment or media item, the electronic device can play back the identified segment or media item from the marked or tagged playback position. This can allow a user to resume listening to the broadcast segment or media item from substantially the same playback position as when the user stopped receiving the broadcast. If a user later switches back to a communications device that has access to a buffered media stream, the communications device can play back the buffered media from a playback position after the portions of the media stream that were played back by the electronic device (e.g., to ensure that the user does not repeatedly listen to the same segment or media item as the user switches between devices).

In some embodiments, the communications device can provide playback information to the cloud or electronic device for updating records of a user's media consumption. For example, the cloud or electronic device can update play counts for media items, such as music, or mark podcasts or stored recordings of media segments as not new. This can enable a user to more easily find segments that are truly new to the user, and provide a more accurate perspective of the user's listening history (e.g., to in turn generate a more accurate preference profile and provide more targeted media item recommendations).

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
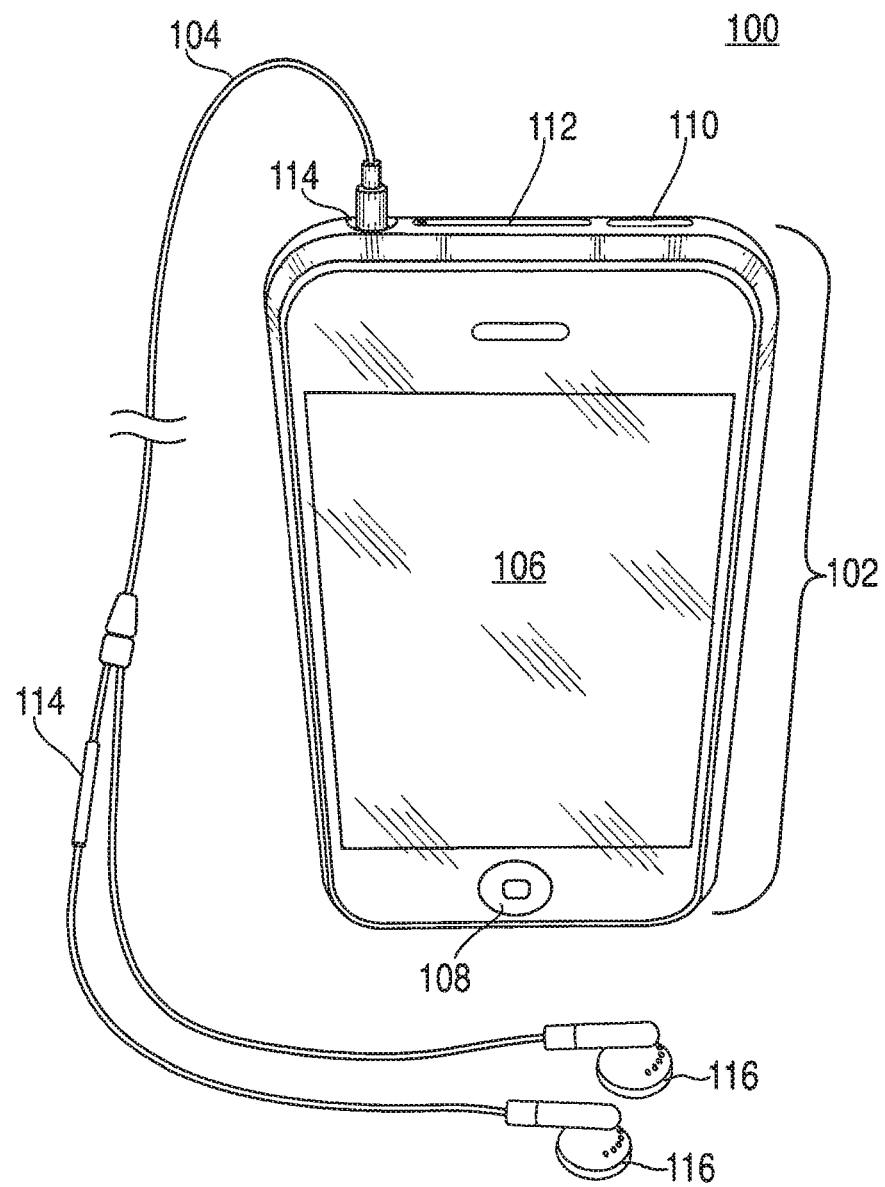
FIG. 1 is a representation of an illustrative electronic device in accordance with some embodiments of the present invention.

Using a communications device, a user can tune to and receive a broadcast stream of media items for playback. A media or content source can provide the broadcast stream over any type of communications network. For example, a user can direct a device having radio tuning circuitry to tune to a radio broadcast provided by a radio station. The communications device can include a stand-alone device, such as a portable radio, or communications circuitry (e.g., dedicated circuitry) for selecting and receiving specific broadcasts (e.g., radio circuitry in a car). In some embodiments, the communications device can communicate with a remote server or cloud, a distinct electronic device, or other component of the communications device to provide an indication of the currently received broadcast. For example, the communications device can provide the information at regular intervals (e.g., every 20 seconds, or every minute). As another example, the communications device can provide information to the electronic device when the received broadcast changes (e.g., when new media items or segments are broadcast, or when the particular received broadcast changes).

A user may sometimes not be able to listen to the entirety of a media item or segment of a broadcast. For example, the communications device can lose a communications network associated with the broadcast. As another example, a user may be required to turn off the communications device or tune away from a broadcast because of an event (e.g., the user has reached his destination and must leave his car, or the user has a meeting that the user must attend). Because of the nature of media broadcasts, a user cannot simply, at a later time, turn the communications device back on, reconnect to the media broadcast, and continue playback of the same media item from the instant where the user last left the broadcast. If the user reconnects to the broadcast, a new media item or segment will be received.

Because a user may wish to continue to listen to a media item after tuning away from a broadcast, the communications device can automatically provide information identifying the last, incompletely played back media item or segment to the cloud, server or electronic device receiving the broadcast identification information. When the user then uses the communications device or another device that is in communication with the cloud, server, or electronic device, the device used by the user can identify the particular media item or segment, and locate an alternate, non-broadcast source for the media item or segment. For example, an electronic device can identify a podcast corresponding to a radio program. As another example, an electronic device can identify a locally stored media item (e.g., song) corresponding to the media item last received as part of the media broadcast. Using the current device, the user can then select to continue playing back the identified broadcast media item or segment from the alternate, non-broadcast source.

In addition to identifying the particular media item or segment last received as part of the media broadcast, the user's device can receive, from the cloud, server or electronic device, a tag or mark identifying the particular playback position of the media item or segment when the receipt of the broadcast ended. To avoid forcing the user to re-hear portions of the media item or segment that were previously heard during the media broadcast, the current device can play back the media item or segment from substantially the tagged or marked particular playback position. For example, playback can resume from the position of the broadcast media item or segment when the received broadcast ended. As another example, playback can resume from a playback position slightly prior to the position of the broadcast media item or segment when the received broadcast ended (e.g., to ensure that the user recalls the context or last topic of a radio segment). The current device can, similarly to the communications device, provide an indication of a current playback position to one or more of the cloud, server, and electronic device so that, should a user again switch to another device or alternate source for the broadcast media item or segment, the user can continue playback from the most current playback position.

In some embodiments, the communications device can instead or in addition provide an indication to one or more of the cloud, server, and electronic device of the particular media items and segments played back in full or in part by the communications device. Using the received information, the cloud, server or electronic device can update play count information, indications of whether media items or segments are new to a user (e.g., if the electronic device automatically downloads a podcast of a broadcast segment), or other information defining a user's playback history. This information can be used, for example, to populate a preference profile.

As used in this application, the term media item will be understood to include any audio or video that can be broadcast by a content source and received by an electronic device for playback. For example, a media item can include music (e.g., a song), a talk show segment, an advertisement, news programming, a podcast, videos, or any other media content that may be provided to a user. In addition, it will be understood that embodiments described in the context of a radio broadcast by a radio station can also be provided using any type of media broadcast by any media or content source over any suitable communications network. Also, it will be understood that while some embodiments may be described in the context of finding and playing back non-broadcast sources of media items, the embodiments can also be implemented by playing back non-broadcast sources of segments, or combinations of segments and media items.

FIG. 1 is a representation of an illustrative user device 100 that is in accordance with some embodiments of the present invention. User device 100 may generally be any device that can receive radio stations. For example, in some embodiments, user device 100 can internally have a radio tuner. In other embodiments, user device 100 can have the necessary ports to be coupled to an external radio tuner. User device 100 can then receive radio signals through the external radio tuner. For example, user device 100 can be a handheld radio, a car radio, a cellular phone, a personal data assistant (PDA), a handheld digital music player such as an iPod™ (available from Apple Inc. of Cupertino, Calif.), or a laptop or notebook computer. Although user device 100 is generally depicted as a handheld device in FIG. 1, user device 100 can also be a non-handheld device such as a desktop computer.

User device 100 can include main device 102 and one or more accessory devices 104. Generally, any of the components of user device 100 described below can be integrated into main device 102, contained in accessory device 104, or both. For example, as discussed above, a radio tuner can be integrated into accessory device 104 or integrated directly inside main device 102. Additionally, although accessory device 104 is depicted as being physically coupled to main device 102 in FIG. 1, accessory device 104 may alternatively be wirelessly coupled to main device 102.

In some embodiments, user device 100 can include display screen 106. Further to the discussion above, display screen 106 does not need to be integrated into main device 102, and in other embodiments can be an accessory device that is physically or wirelessly coupled to main device 102. Display screen 106 can include any suitable screen, such as a television screen, a computer monitor, a projection screen, a liquid crystal display (LCD) screen, or an organic light-emitting diode (OLED) screen. Display screen 106 can present various types of information to the user such as graphical and/or textual displays. This can include, for example, user-selectable options, radio station playlists, music playlists, stored videos, stored photos, stored data, and system information. In some embodiments, display screen 106 can function as a user input mechanism that allows for a touch screen or user input via a touch input (e.g., from actual or near contact of a user's finger or of a tool with the screen).

User device 100 can also include one or more of user input mechanisms 108 and 110. These mechanisms can be, for example, a keyboard, buttons, switches, track wheels, or click wheels. User device 100 can include one or more of port 112 for coupling external data and/or hard drives into user device 100. For example, port 112 can enable user device 100 to receive SIM cards, flash drives, or external hard drives. There can be multiple ways of connecting accessories devices through, for example, connector 114. Persons skilled in the art will appreciate that connector 114 can be any suitable connector such as one or more USB ports, 30-pin connector ports, dock or expansion ports, and headset jacks.

User device 100 can also include user input/output devices such as microphone 114 and speakers 116. Although depicted as being contained in accessory device 104, one skilled in the art would appreciate that microphone 114 and speakers 116 may alternatively or additionally be contained in main device 102.

Figure 2:
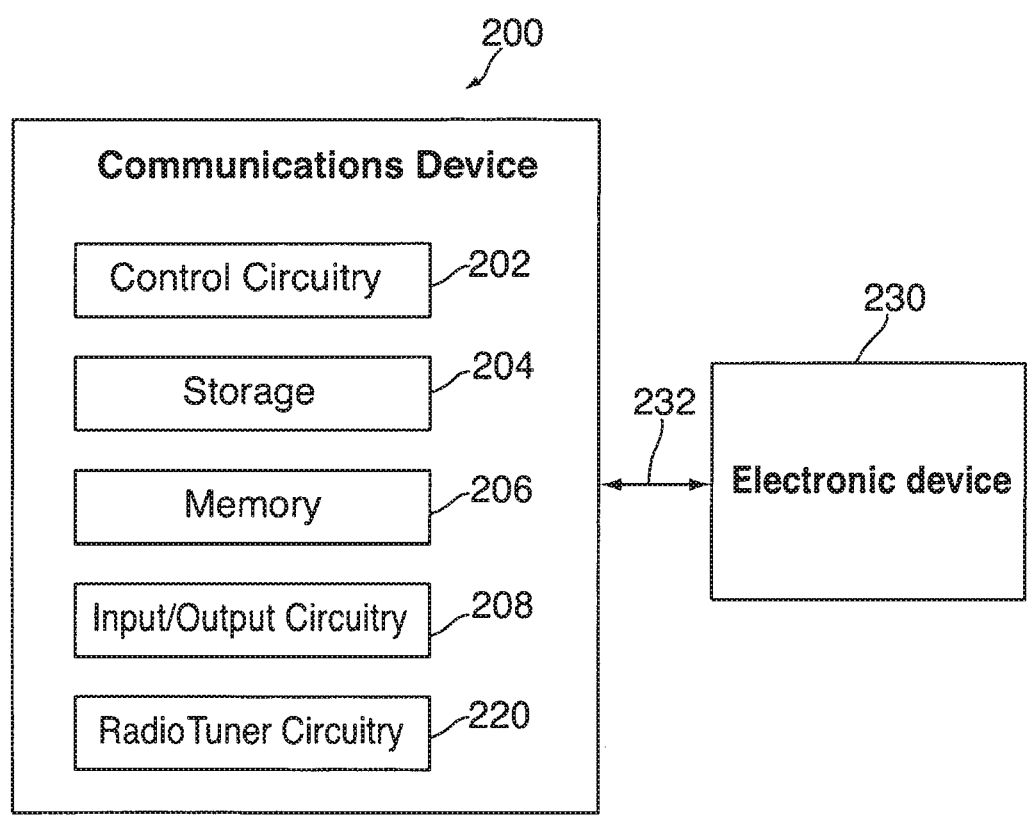
FIG. 2 is a schematic view of an illustrative communications device coupled to an electronic device in accordance with some embodiments of the present invention.

FIG. 2 is a schematic view of an illustrative communications device in communication with an electronic device in accordance with some embodiments of the invention. For example, communications device 200 can correspond to user device 100 of FIG. 1. Communications device 200 can include control circuitry 202, storage 204, memory 206, input/output circuitry 208, and radio tuner circuitry 210. In some embodiments, one or more of the components of communications device 200 can be combined or omitted (e.g., combine storage 204 and memory 206). In some embodiments, communications device 200 can include other components not combined or included in those shown in FIG. 2 (e.g., motion detection components, a power supply such as a battery, or a bus), or several instances of the components shown in FIG. 2. For the sake of simplicity, only one of each of the components is shown in FIG. 2. In some embodiments, some of the components of communications device 200 can instead be placed in electronic device 230, such that communications device 200 includes substantially only radio tuner circuitry 210 and other communications circuitry for providing and receiving information to and from electronic device 230. In some embodiments, the functionality of communications device 200 and electronic device 230 can be combined in a single device.

Control circuitry 202 can include any processing circuitry or processor operative to control the operations and performance of communications device 200. For example, control circuitry 200 can be used to run operating system applications, firmware applications, media playback applications, radio tuner applications, or any other application. In some embodiments, the control circuitry can drive a display and process inputs received from a user interface.

Storage 204 can include, for example, one or more storage mediums including a hard-drive, solid state drive, flash memory, permanent memory such as ROM, any other suitable type of storage component, or any combination thereof. Storage 204 can store, for example, media data (e.g., music and video files), application data (e.g., for implementing functions on device 200), firmware, user preference information data (e.g., radio preset preferences), authentication information (e.g. libraries of data associated with authorized users), wireless connection information data (e.g., information that can enable user device 200 to establish a wireless connection), and any other suitable data or any combination thereof.

Memory 206 can include cache memory, semi-permanent memory such as RAM, and/or one or more different types of memory used for temporarily storing data. In some embodiments, memory 206 can also be used for storing data used to operate user device applications, or any other type of data that can be stored in storage 204. In some embodiments, memory 206 and storage 204 can be combined as a single storage medium.

Input/output circuitry 208 can be operative to convert (and encode/decode, if necessary) analog signals and other signals into digital data. In some embodiments, input/output circuitry 208 can also convert digital data into any other type of signal, and vice-versa. Although input/output circuitry 208 is illustrated in FIG. 2 as a single component of communications device 200, several instances of input/output circuitry can be included in communications device 200.

Radio tuner circuitry 210 can include any suitable circuitry for tuning to a particular frequency of a received radio signal. For example, by resonating at a particular frequency, radio tuner circuitry 210 can pass that particular frequency and exclude any other frequencies that were received with the radio signal. Radio tuner circuitry can communicate with input/output circuitry 208 to audibly output the particular frequency through, for example, speakers 116 of FIG. 1. In some embodiments, the electronic device can instead or in addition include communications circuitry operative to connect to other types of content sources using different types of communications networks, such as communications circuitry for connecting to satellite radio stations, Internet radio stations, dedicated broadcast sources (e.g., on-demand content sources), or any other suitable content source. For the sake of brevity, it will be understood that any suitable content source and any communications network can be used instead of or in addition to a radio station and a radio network in the following discussion.

In some embodiments, communications device 200 can include a bus operative to provide a data transfer path for transferring data to, from, or between control processor 202, storage 204, memory 206, input/output circuitry 208, radio tuner circuitry 210, and any other component included in the user device.

Communications device 200 can be coupled to electronic device 230 via communications path 232. Electronic device 230 can include any suitable type of device operative to provide power, data (e.g., media files) or both to communications device 200. For example, electronic device 230 may include a computer (e.g., a desktop or laptop computer), a server (e.g., a server available over the Internet or using a dedicated communications link), a kiosk, or any other suitable device. In some embodiments, electronic device 230 can include a remote server, for example accessible over the Internet. Electronic device 230 can include any suitable communications circuitry for communication with electronic device over communications path 232.

Communications path 232 can be provided by any suitable communications circuitry operative to connect to a communications network and to transmit communications (e.g., voice or data) from communications device 200 to electronic device 230, or other devices within a communications network. Communications path 232 can support any suitable communications protocol such as, for example, Wi-Fi (e.g., a 802.11 protocol), Bluetooth (registered trademark), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol. In some embodiments, communications path 232 may be operative to receive media or data over the Internet (e.g., streaming media or downloaded media).

Figure 3:
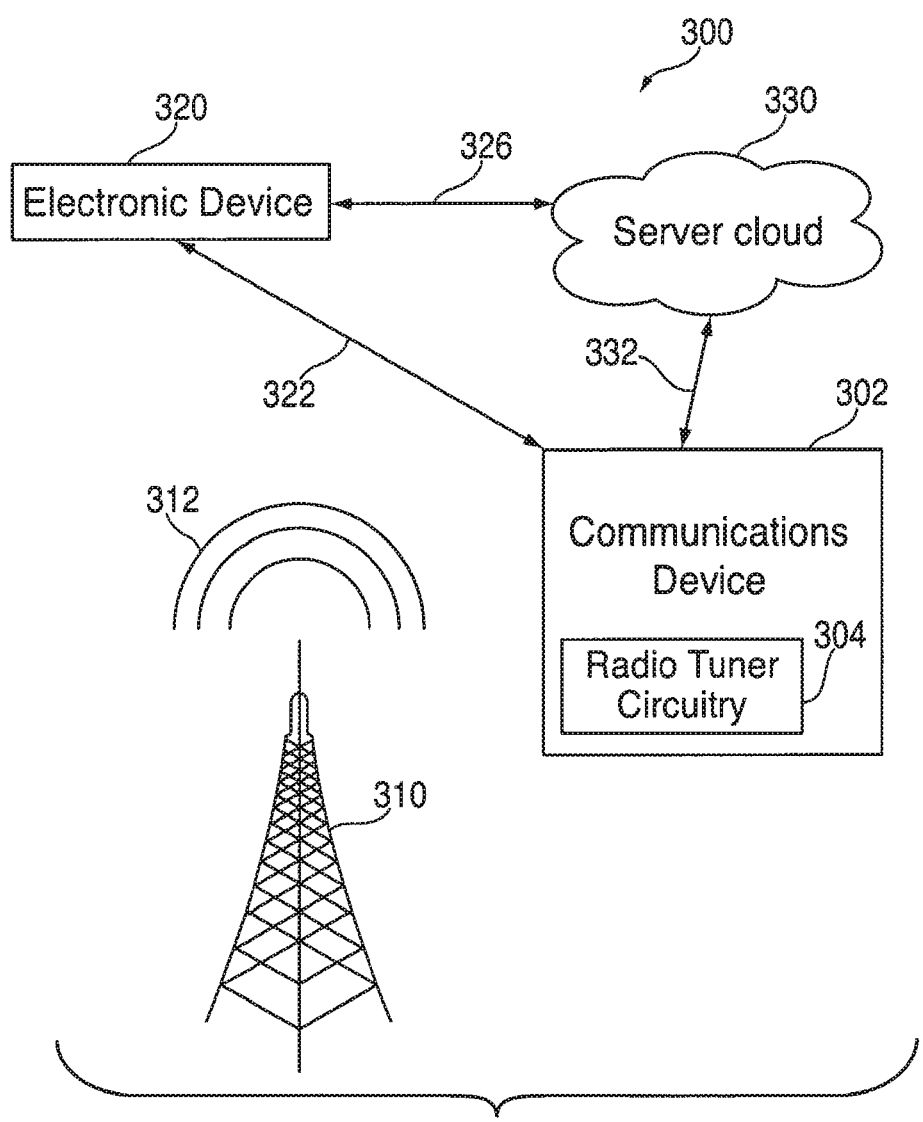
FIG. 3 is a schematic view of an illustrative system for providing and receiving radio broadcasts in accordance with one embodiment of the invention.

The communications device can receive media streams from a variety of sources. In some embodiments, the communications device can receive a radio stream. FIG. 3 is a schematic view of an illustrative system for providing and receiving radio broadcasts in accordance with one embodiment of the invention. System 300 can include one or more communications devices 302 operative to receive radio station broadcasts, although only one is shown in FIG. 3 for simplicity. Each communications device 302 can include radio tuner circuitry 304 operative to tune to and receive a radio broadcast. Radio station 310 can provide broadcast 312 of media using, for example, a AM or FM radio signal, for any communications device 302 within the broadcast range of radio station 310. In addition to the media, radio station 310 can broadcast radio station information such as Radio Data System (RDS) information. RDS information can include, for example, digital information such as station identification, the current song's track, artist, genre, and length information, and/or alternative frequencies for particular stations.

Each media broadcast to which the communications device can tune can include several media items or segments. Each media item or segment can be characterized by distinct metadata, such as genre, artist, title, album metadata for music; host, guest, topic for talk segments; type, sponsor for a weather, news, or advertisement segment. The communications device can identify a broadcast media item or segment using any suitable approach. For example, the communications device can monitor each radio station and retrieve data describing each broadcast media item (e.g., identified from an analysis of the broadcast audio, or from metadata broadcast with the media, such as RDS, RT or RT+ data). As another example, the communications device can access a remote database that includes a listing of the media items broadcast or to be broadcast by particular radio stations. The remote database can be provided by individual radio stations, or generated and managed by a specialized entity. As still another example, the communications device can identify media items provided by a radio station from alternative sources of the radio broadcast, such as a counterpart Internet radio station of a terrestrial or Internet radio station. The communications device can monitor the alternative source, or alternatively retrieve listings of broadcast media items from the alternative source (e.g., retrieve from the past ten songs broadcast from a radio station website, or determine future guests on a talk show program from a website schedule).

System 300 can include one or more electronic devices 320 or server clouds 330 operative to communicate with communications device 302 via communications paths 322 and 332, respectively. Communications paths 322 and 332 can be provided over any suitable wired or wireless communication path, including for example using any of the types of communications networks or paths described above in connection with communications path 232 (FIG. 2). In some embodiments, electronic device 320 and server cloud 330 can instead or in addition communicate via communications path 236, which can include some or all of the features of communications paths 322 and 332.

Communications device 302 can provide any suitable information to electronic device 320 or server cloud 330. In some embodiments, communications device 302 can provide periodic information identifying a received media broadcast to the electronic device or cloud. For example, communications device 302 can provide a series of data packets identifying a received radio station, particular media items or segments received at a particular moment in time, or any other suitable information. The data packets can be provided at any suitable interval, including for example at specific time-based intervals (e.g., every 10 seconds, 20 seconds, 1 minute, 3 minutes, 5 minutes). In some embodiments, the provided information can include a time stamp or identify a particular playback position for received media items or segments (e.g., data specifies the playback position of the currently playing back media item at the time the data is sent).

In some embodiments communications device 302 can provide information to one or more of electronic device 320 and cloud 330 in response to detecting particular events. For example, communications device 302 can provide the information in response to detecting a new media stream (e.g., the user tunes to a new radio station). As another example, communications device 302 can provide the information in response to detecting a change in or a particular type of media item or segment (e.g., provide information only when the received segment is not an advertisement). In some embodiments, communications device 302 can provide information in response to detecting an instruction to turn off the circuitry for receiving the media item. For example, in response to receiving an instruction to power down the communications device, the device can send a transmission to the electronic device or cloud identifying one or more of the media broadcast, the media item or segment played back, a time stamp, and the current playback position of the media item or segment.

Sometimes, a user may not be able to listen to the entirety of a broadcast media item or segment. For example, a user may receive a radio broadcast using a car radio, arrive at his destination, and need to turn the car and radio off before the end of a media item or segment. As another example, a received media broadcast segment may not be over when a user needs to attend a meeting. As still another example, a communications device receiving a media broadcast can wander out of range of the media source and cease receiving the media broadcast. If the user then, at a later time, again directs a communications device to tune to the radio station or media broadcast, the particular media items and segments received will no longer be the same.

To listen to a broadcast media item or segment in its entirety, a user may be required to remain in a particular location or keep on a communications device until the end of the media item or segment. For example, a user may remain in a car with the radio on despite having arrived at a destination and being parked to listen to the end of the segment. As another example, a user may be late to a meeting to finish listing to a radio program. While this can provide a solution for listening desirable media broadcasts in their entireties, it can significantly limit a user's movements. As another solution for listening to a broadcast media item or segment in its entirety, a communications device can have the capability of recording, in a buffer, the received broadcast. The user can then return to the stored broadcast at a later time and resume media playback from the buffer to listen to the media item or segment. This approach, however, assumes that the communications device can record received content, and requires the user to return to the same communications device to hear the remaining portions of the media broadcast.

In some embodiments, instead of relying on the original broadcast of the media item or segment, a user can direct an electronic device to find and access an alternate source for the particular media item or segment that was incompletely received in the media broadcast. Although the following discussion will describe embodiments of the invention in the context of a radio device receiving a radio broadcast that includes several radio segments, it will be understood that the discussion also applies to any suitable communications device receiving any suitable type of media broadcast that includes any suitable media item, segment, or other broadcast content. In addition, although the following discussion will describe embodiments of the invention in the context of using an electronic device to identify and retrieve a podcast of the radio segments, it will be understood that any combination of electronic devices, servers, clouds, or other devices can be used to identify and play back any suitable type of non-broadcast content corresponding to the media broadcast media items or segments.

A radio device can receive a radio broadcast from a particular radio station. Due to a number of reasons, a user may need to tune away from or turn off the radio broadcast before a broadcast radio segment ends. To continue to listen to the radio segment after the segment has been broadcast, a user can direct an electronic device to identify an alternate source for the radio segment and access the segment from the alternate source. The electronic device can identify the radio segment for which to find an alternate source using any suitable approach. In some embodiments, the electronic device can receive a communication from the radio device providing identification information for the radio segment. For example, the radio device can, via a communications path with the electronic device, provide identification information at regular intervals or in response to detecting an event (e.g., a portable music player connected to a dock having a radio, or connected via cable to a car entertainment system). In some embodiments, the electronic device can instead or in addition receive the identification information from a remote server or cloud to which the radio device provides information. The remote server or cloud can be dedicated to one or more radio devices, or one or more users of radio devices. For example, the remote server or cloud can store current media broadcast information for subscribers, and provide information only to electronic devices associated with the particular subscribers. Subscribers can include particular users, each of which can own one or more radio devices, or specific radio devices (e.g., all radio devices manufactured by a particular manufacturer, having particular specifications, or particular device models).

The electronic device can receive any suitable type of information identifying the radio segment. For example, the electronic device can receive information identifying the particular radio segment (e.g., artist and song names, or host and guest names). As another example, the electronic device can receive information identifying the particular radio broadcast (e.g., the frequency of the transmission or radio station name), as well as a time stamp (e.g., absolute time, or a running duration from the beginning of the radio segment). The electronic device can then refer to a database or access information provided by the radio station (e.g., a radio station website) to retrieve a schedule of broadcast segments and identify the segment associated with the received time stamp.

Once the electronic device has identified the particular radio segment that was incompletely played back, the electronic device can, automatically or in response to a user instruction (e.g., only for broadcast segments of interest to the user), identify an alternate, non-broadcast source for the segment. For example, the electronic device can automatically identify a unicast media stream provided by the content source (e.g., a web-based stream provided over the Internet from the radio station website). As another example, the electronic device can identify a podcast associated with a corresponding radio program, or a podcast episode for the identified radio segment. As still another example, the electronic device can identify a media item or segment locally stored or accessible from a host device or server in a media library (e.g., a library associated with the user or with the device). The electronic device can stream or download the segment from the alternate source before or during playback.

Figure 4:
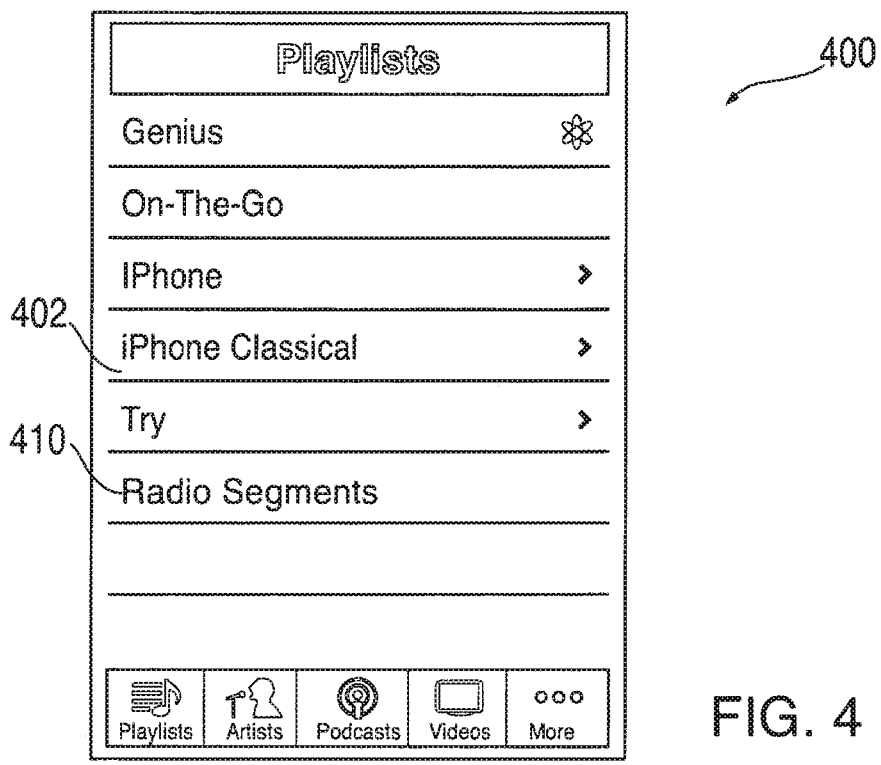
FIG. 4 is a schematic view of an illustrative display for selecting radio segments in accordance with one embodiment of the invention.
Figure 5:
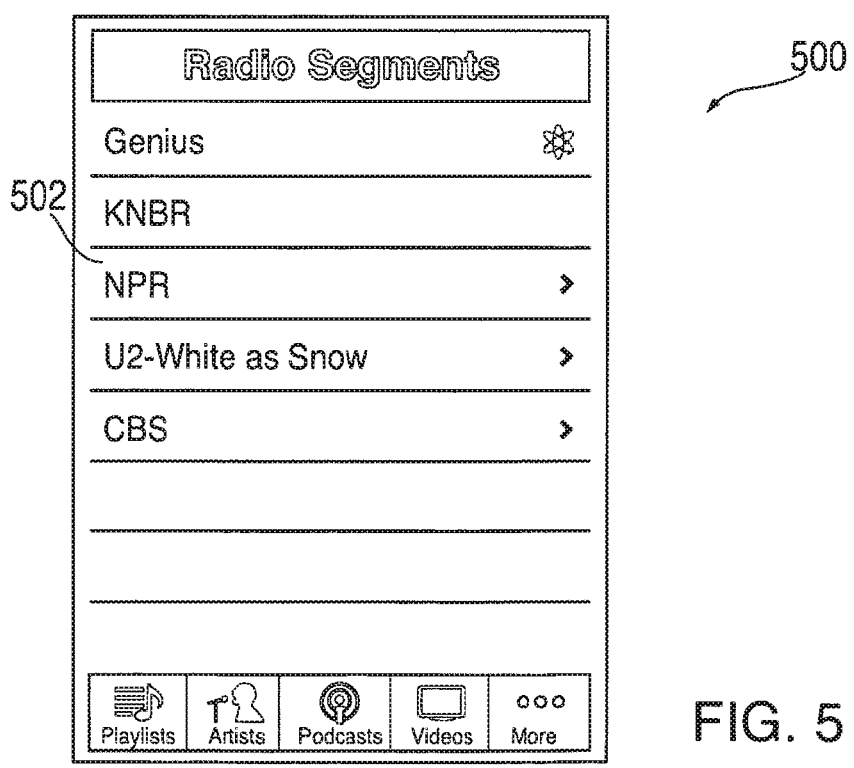
FIG. 5 is a schematic view of an illustrative display of non-broadcast radio segments in accordance with one embodiment of the invention.

The electronic device can provide any suitable interface for selecting a non-broadcast source for a radio segment. FIG. 4 is a schematic view of an illustrative display for selecting radio segments in accordance with one embodiment of the invention. Display 400 can include listing 402 of selectable options for selecting media for playback. Among listings 402, electronic device 400 can provide option 410 for selecting radio segments retrieved from non-broadcast sources. In response to receiving a user selection of option 410, the electronic device can display a listing of available non-broadcast radio segments. FIG. 5 is a schematic view of an illustrative display of non-broadcast radio segments in accordance with one embodiment of the invention. Display 500 can include listings 502 of nonbroadcast radio segments retrieved based on the radio segments to which the user incompletely listened using a radio device. In response to receive a user selection of a listing 502, the electronic device can play back the corresponding segment.

The electronic device can play back the radio segment from any suitable playback position. In some embodiments, the electronic device can play back the segment from substantially the same playback position as when the communications device stopped playing back the radio segment. Alternatively, the electronic device can play back the segment from before the playback position at which the radio broadcast was stopped to ensure that the user does not miss any of the radio segment, and remembers the content of the segment. For example, the radio segment can be played back from a playback position that is a particular amount of time prior to the last playback position (e.g., 10 seconds, 30 seconds, 2 minutes, or 5 minutes before). As another example, the playback position can be selected based on the content or elements of the radio segment (e.g., play back a radio segment from the beginning of the current song, play back from the beginning of a guest interview, or play back from the last return from commercial).

The electronic device can determine the last playback position of the radio segment using any suitable approach. In some embodiments, the communications device can transmit to the electronic device, a remote server, or a cloud, a time stamp or playback position flag (e.g., absolute time, time lapsed since the beginning of the segment, or time lapsed since a known starting point). Using the received time stamp or playback position flag, and radio segment scheduling information (if necessary), the electronic device can determine the proper playback position of the radio segment. The playback position information can be transmitted with or apart from the information identifying the radio station or radio segment.

In some cases, a user may not finish listening to a non-broadcast radio segment using the electronic device. Instead, the user may only listen to part of the segment before needing to turn away. To allow the user to then resume listening to the radio segment from the new playback position, the electronic device can provide the new or updated playback position to other electronic devices owned by the user (e.g., the communications device), a remote server, or a cloud accessible by the user. When the user then selects the radio segment using the same or another electronic device, the other electronic device can identify the new or updated playback position, and resume playback from substantially the new or updated playback position. In some embodiments, if the communications device recorded the radio segment in a buffer, the user can return to the communications device to play back the radio segment from the buffer at the new or updated playback position. This can allow a user, for example, to start listening to a radio program in a car driving to a gym, continue during a workout (e.g., using a portable media device with a downloaded podcast episode), and finish the radio program in the car returning from the gym.

In some embodiments, one or more of an electronic device, remote server, and cloud can monitor and track particular media items and segments to which a user listens using a communications device. For example, the media broadcast information provided by the communications device can be used to identify the particular media items to which the user listens (e.g., using the identification information to retrieve a schedule of segments or media items broadcast while the radio device was tuned to the radio station). The electronic device, server or cloud receiving the playback information can use the playback information to update a history of the user's media consumption, a user preference profile (e.g., change the user rating on media items that are played back in full), play counts for particular media items stored in a user's library (e.g., when the library or library metadata is stored by or available to the electronic device, server or cloud), or update other playback information. In some embodiments, the playback information can be used to mark content in the user's media library as not new (e.g., mark podcast episodes corresponding to radio segments received by a radio device as not new). A communications device may need to play back at least a minimum amount of a radio segment before the corresponding segment in the user's media library is marked as not new. For example, the communications device may need to play back at least 50%, 75%, 90%, or all of the radio segment for it to be considered not new.

Figure 6:
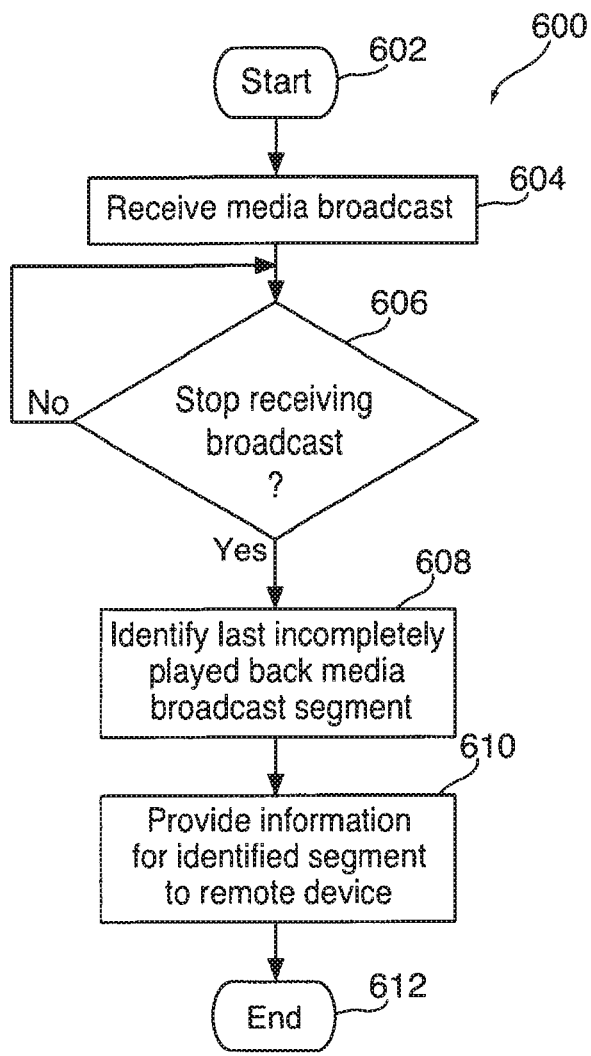
FIG. 6 is a flowchart of an illustrative process for identifying a partially played back media stream segment in accordance with one embodiment of the invention.

The following flowcharts describe illustrative processes for use in identifying radio stations of interest. FIG. 6 is a flowchart of an illustrative process for identifying a partially played back media stream segment in accordance with one embodiment of the invention. Process 600 can begin at step 602. At step 604, a communications device can receive a media broadcast. For example, a radio device can receive a radio stream provided by a radio station. As another example, an electronic device can receive a broadcast media stream provided over the Internet. At step 604, the communications device can determine whether the media broadcast is still received. For example, the communications device can determine whether the device is being turned off. As another example, the communications device can determine whether a communications network providing the media broadcast is lost (e.g., device moved out of range). If the communications device determines that the media broadcast is still received, process 600 can return to step 604 and continue to monitor for broadcast receipt.

If, at step 606, the communications device instead determines that the media broadcast is no longer received, process 600 can move to step 608. At step 608, the communications device can identify the last incompletely played back media broadcast segment. For example, the communications device can retrieve RDS data associated with a received radio stream to identify the particular segment being played back. As another example, the communications device can identify the media broadcast (e.g., the radio station) and provide a time stamp that can be used to retrieve, from a schedule or other appropriate source, the last incompletely played back media broadcast segment. At step 610, the communications device can provide the information for identifying the broadcast segment to a remote device. For example, the communications device can provide the information to one or more of an electronic device, remote server, and cloud. The remote device can be associated with the user or with the communications device (e.g., via user accounts) so that the user can access the information stored in the remote device at a future time. Process 600 can then end at step 612.

Figure 7:
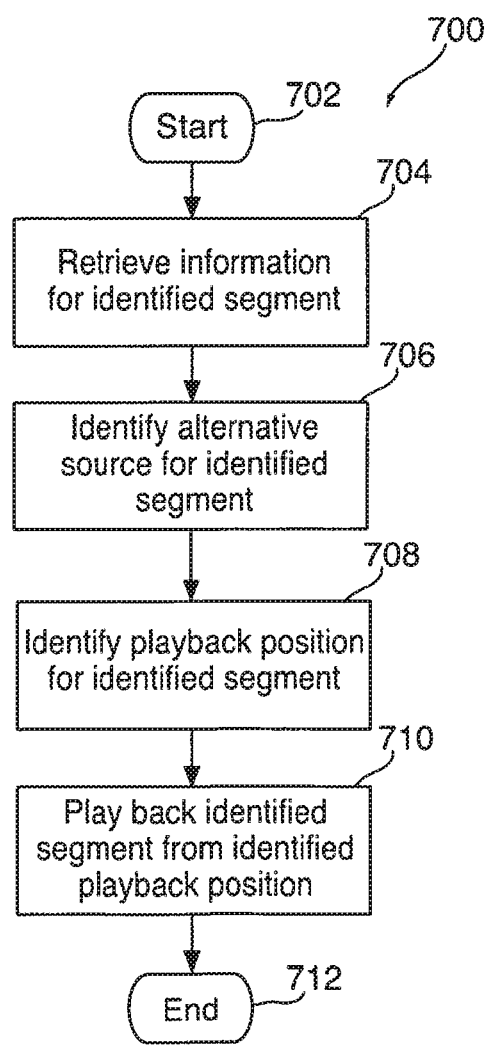
FIG. 7 is a flowchart of an illustrative process for playing back a media stream from a non-broadcast source in accordance with one embodiment of the invention.

FIG. 7 is a flowchart of an illustrative process for playing back a media stream from a non-broadcast source in accordance with one embodiment of the invention. Process 700 can begin at step 702. At step 704, an electronic device can retrieve information for identifying a broadcast media segment. For example, an electronic device can retrieve information provided by a communications device receiving the broadcast media segment (e.g., at step 610 of process 600, FIG. 6), from a remote server in communication with both the electronic device and the communications device, or from a cloud receiving and storing information received from communications devices. Using the retrieved information, the electronic device can identify the particular media segment, for example from retrieved information identifying the media segment, or from retrieved information identifying the media broadcast and a time stamp, and reference a schedule or source of scheduling information for the media broadcast.

At step 706, the electronic device can identify an alternate source for the media segment identified at step 704. For example, the electronic device can search a local or remote library of media items and segments for a match. As another example, the electronic device can retrieve the address for a remote server (e.g., a web page from RDS data associated with a radio station) from which the electronic device can search for the segment. As still another example, the electronic device can direct a dedicated application to search for podcasts or other specific forms of non-broadcast media segments that match the identified segment (e.g., using the iTunes store, available from Apple Inc. of Cupertino, Calif. to search for podcasts). At step 708, the electronic device can identify the playback position from which to play back the media segment retrieved from the alternate source. For example, the electronic device can identify the prior playback position of the media segment when the communications device tuned away from the segment, and select a playback position that is substantially the same as or prior to the identified prior playback position. The electronic device can determine the prior playback position using any suitable approach, including for example based on timing information provided by the communications device (e.g., an absolute time stamp, a time lapse since a particular event such as a return from commercial, or a duration from the beginning of the segment). The identified playback position can be ahead the prior playback position by any suitable amount, including for example by 5 seconds, 10 seconds, 30 seconds, 1 minute, 5 minutes, or any other suitable duration. In some embodiments, the duration may be determined relative to the duration of the segment (e.g., 1% or 5% of the total duration of the segment). In some embodiments, the duration can be determined based on features of the media item audio (e.g., chorus, verse, change in speaker, audio jingle, or other detectable changes in the played back audio).

At step 710, the electronic device can play back the identified segment from the identified playback position. In some embodiments, the electronic device can instead or in addition provide information regarding the new playback position and the particular media segment played back to one or more of other electronic devices, the communications device, a remote server, and a cloud. This may in turn allow a user to stop playing back the media segment using the electronic device, and resume playback from a different device (e.g., return to the communications device, where the alternate source for the segment is a local buffer used to record the received media broadcast). Process 700 can then end at step 708.

Figure 8:
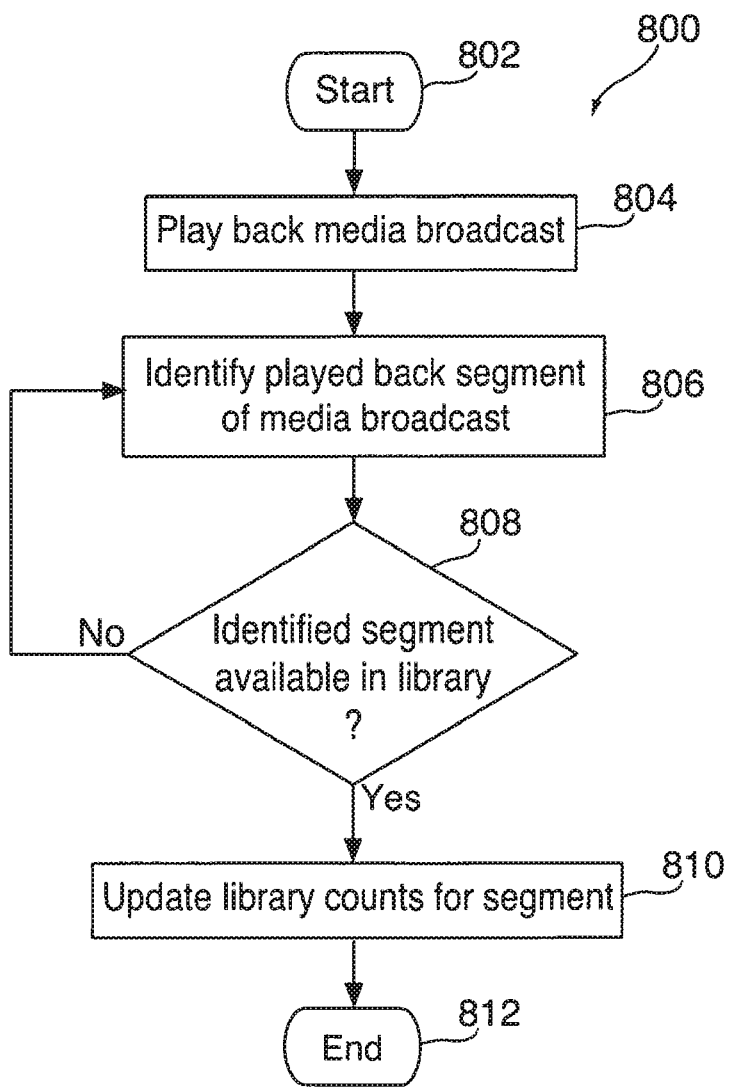
FIG. 8 is a flowchart of an illustrative process for updating library counts based on segments played back as part of a media broadcast in accordance with one embodiment of the invention.

FIG. 8 is a flowchart of an illustrative process for updating library counts based on segments played back as part of a media broadcast in accordance with one embodiment of the invention. Process 800 can begin at step 802. At step 804, a communications device can play back a received media broadcast. For example, the communications device can receive and play back a radio broadcast. At step 806, the communications device can identify the currently played back segment of the media broadcast. For example, the communications device can retrieve metadata or other information provided as part of the media broadcast that identifies the currently played back segment. As another example, the communications device can access a remote source or server that includes a schedule or listing of media segments broadcast as part of the media broadcast. At step 808, the communications device can determine whether the identified segment is available in a library associated with one or more of the communications device and a user of the communications device. For example, the communications device can provide the information identifying the segment to a remote device or server having access or managing the library. As another example, the communications device can compare the identified segment with segments of a local library stored in the communications device. If the communications device determines that the identified segment is not available in the library, process 800 can return to step 806 and identify the next played back media segment.

If, at step 808, the communications device instead determines that the identified segment is available in the library, process 800 can move to step 810. At step 810, the communications device can update library counts for the identified segment. For example, the communications device can update play counts for locally stored media items, mark non-broadcast copies of the broadcast segments as not new (e.g., mark podcast episodes for a radio segment received over the radio as not new), change user preference ratings for library items, or change any other count or metadata associated with library items. Process 800 can then end at step 812.

The above described embodiments of the present invention are presented for purposes of illustration and not of limitation, and the present invention is limited only by the claims which follow.

What is claimed is:

1. A communications device for enabling an electronic device that is remote from the communications device to identify a non-broadcast source and play back media items retrieved from the non-broadcast source, the communications device comprising communications circuitry and a processing system, the processing system operative to:
   direct the communications circuitry to receive a media broadcast, wherein the media broadcast comprises a plurality of media items;
   identify a last received media item of the media broadcast;
   identify a last playback position of the last received media item; and
   send identification information for the last received media item and the last playback position from the communications device to a user account of a cloud service, wherein the electronic device is to receive the identification information and the last playback position of the last received media item from the user account of the cloud service and to begin playback of the last received media item on the electronic device, from a user-selected playback position, in response to the user selecting the last received media item and selecting the playback position using the electronic device.

2. The communications device of claim 1, wherein the processing system is further operative to:
   determine a duration of a pre-determined portion of the last received media item; and
   identify an alternate playback position that is prior to the identified last playback position by the determined duration, wherein the electronic device is to play back the last received media item from the identified alternate playback position.

3. The communications device of claim 2, wherein the pre-determined portion is selected based on at least one of:
a total duration of the last received media item;
a duration between a beginning and the identified last playback position of the last received media item; or
features of the last received media item's audio.

4. The communications device of claim 1, wherein the communications device is further operative to:
periodically send, to the user account of the cloud service, identification information of a currently playing media item and a current playback position at the time of the sending such that the communications device provides a series of data packets identifying received media items and their respective playback positions.

5. The communications device of claim 4, wherein the electronic device can retrieve from the user account of the cloud service, and playback on the electronic device, any media item, from a plurality of media items, whose identification information and playback position was periodically transmitted to the user account of the cloud service by the communications device.

6. The communications device of claim 1, wherein the electronic device is further to:
determine that the last received media item is locally stored in memory; and play back the locally stored media item.

7. The communications device of claim 1 wherein the nonbroadcast source is a streaming source.

8. The communications device of claim 1 wherein the identification information is sent through a wireless communication path.

9. The communications device of claim 1, wherein the user account of the cloud service stores a plurality of media items that have been broadcast to the communications device, and the user account of the cloud service stores a last playback position for each of the plurality of media items that have been broadcast to the communications device.

10. The communications device of claim 1, further comprising:
transmitting, by the communications device, to the user account of the cloud service, a status signal at a periodic interval, and in response to the cloud service no longer receiving the status signal from the communications device, the cloud service determining that the last playback position of the communications device is a time of a last received status signal from the communications device, and the cloud service stores, in the user account, the time of the last received status signal as the last playback position of the communications device.

11. The communications device of claim 1, further comprising:
resuming playback of the last received media item on the communications device, from the last playback position stored at the user account of the cloud service.

12. The communications device of claim 11, wherein the last playback position stored at the user account of the cloud service was obtained by the cloud service from the electronic device.

13. The communications device of claim 11, wherein the playback on the communications device is resumed using a non-broadcast source.

14. A method performed by a communications device for enabling an electronic device that is remote from the communications device to identify a nonbroadcast source and play back media items retrieved from the non-broadcast source, the communications device comprising communications circuitry and a processing system, the method comprising:
directing the communications circuitry to receive a media broadcast, wherein the media broadcast comprises a plurality of media items;
identifying a last received media item of the media broadcast;
identifying a last playback position of the last received media item; and
sending identification information for the last received media item and the last playback position from the communications device to a user account of a cloud service, wherein the electronic device is to receive the identification information and the last playback position of the last received media item from the user account of the cloud service and to begin playback of the last received media item on the electronic device from a user selected playback position, in response to the user selecting the last received media item and selecting the playback position using the electronic device.

15. The method of claim 14, wherein the method further comprises:
determining a duration of a pre-determined portion of the last received media item; and
identifying an alternate playback position that is prior to the identified last playback position by the determined duration, wherein the electronic device is to play back the last received media item from the identified alternate playback position.

16. The method of claim 15, wherein the pre-determined portion is selected based on at least one of:
a total duration of the last received media item;
a duration between a beginning and the identified last playback position of the last received media item; or
features of the last received media item's audio.

17. The method of claim 14, further comprising:
periodically sending, to the user account of the cloud service, identification information of a currently playing media item and a current playback position at the time of the sending such that the communications device provides a series of data packets identifying received media items and their respective playback positions.

18. The method of claim 14, wherein the method further comprises:
determining that the last received media item is locally stored in memory; and
playing back the locally stored media item.

19. The method of claim 14 wherein the nonbroadcast source is a streaming source.

20. The method of claim 14 wherein the identification information is sent through a wireless communication path.

21. A non-transitory machine readable medium storing instructions which when executed by a communications device cause the communications device to perform a method for enabling an electronic device that is remote from the communications device to identify a nonbroadcast source and play back media items retrieved from the non-broadcast source, the communications device comprising communications circuitry and a processing system, the method comprising:
directing the communications circuitry to receive a media broadcast, wherein the media broadcast comprises a plurality of media items;

identifying a last received media item of the media broadcast;

identifying a last playback position of the last received media item; and sending identification information for the last received media item and the last playback position from the communications device to a user account of cloud service, wherein the electronic device is to receive the identification information and the last playback position of the last received media item from the user account of the cloud service and to begin playback of the last received media item on the electronic device from a user-selected playback position, in response to the user selecting the last received media item and selecting the playback position using the electronic device.

22. The medium of claim 21, wherein the method further comprises:

determining a duration of a pre-determined portion of the last received media item; and identifying an alternate playback position that is prior to the identified last playback position by the determined duration, wherein the electronic device is to play back the last received media item from the identified alternate playback position.

23. The medium of claim 22, wherein the pre-determined portion is selected based on at least one of:

a total duration of the last received media item;

a duration between a beginning and the identified last playback position of the last received media item; or features of the last received media item's audio.

24. The medium of claim 21, further comprising:

periodically sending, to the user account of the cloud service, identification information of a currently playing media item and a current playback position at the time of the sending such that the communications device provides a series of data packets identifying received media items and their respective playback positions.

25. The medium of claim 21, wherein the method further comprises:

determining that the last received media item is locally stored in memory; and playing back the locally stored media item.

26. The medium of claim 21 wherein the nonbroadcast source is a streaming source.

27. The medium of claim 21 wherein the identification information is sent through a wireless communication path.

* * * * *